(12) United States Patent
Liao (10) Patent No.: US 11,338,654 B1
(45) Date of Patent: May 24, 2022

(54) CONCEALED AUTOMOBILE GLARE SHIELD DEVICE WITH SLIDING GROOVE

(71) Applicant: Cheng-Chang Liao, Yunlin County (TW)

(72) Inventor: Cheng-Chang Liao, Yunlin County (TW)

( * ) Notice: Subject to any disclaimer, the term of this patent is extended or adjusted under 35 U.S.C. 154(b) by 30 days.

(21) Appl. No.: 17/136,244

(22) Filed: Dec. 29, 2020

(51) Int. Cl.
*B60J 3/02* (2006.01)

(52) U.S. Cl.
CPC .................................. *B60J 3/0208* (2013.01)

(58) Field of Classification Search
CPC ....................................................... B60J 3/0208
USPC ............................................................ 296/97.8
See application file for complete search history.

(56) References Cited

U.S. PATENT DOCUMENTS

| | | | | |
|---|---|---|---|---|
| 4,828,314 A * | 5/1989 | Gavagan | ................ | B60J 3/0208 160/DIG. 3 |
| 5,662,371 A * | 9/1997 | Gera | ..................... | B60J 3/0208 52/223.14 |
| 5,842,748 A * | 12/1998 | Cummins | .............. | B60J 3/0208 296/97.8 |
| 6,371,546 B1 * | 4/2002 | Jefferson | ................ | B60J 1/2011 296/97.8 |
| 7,275,778 B2 * | 10/2007 | Asai | ....................... | B60J 3/0204 296/97.11 |
| 8,215,696 B2 * | 7/2012 | Akiya | .................... | B60J 3/0204 160/370.21 |

* cited by examiner

*Primary Examiner* — Joseph D. Pape
*Assistant Examiner* — Veronica Marie Shull (57) ABSTRACT

A sun visor device includes a sun visor including a receiving portion having two guiding grooves at two lateral sides thereof. A glare shield is slidably received in the receiving portion. A track device is disposed in the receiving portion and includes an outer track, a middle track slidably received in the outer track, an inner track slidably received in the middle track and fixed to a supporting rod. Two positioning members are disposed on two ends of the supporting rod, respectively. A pressing member is received in an outer end of each positioning member and is biased outward by a pressing spring to slidably abut an inner wall of an associated guiding groove. Each positioning member further includes a clamping unit fixed to two ends of the glare shield, such that the glare shield is jointly movable with the supporting rod.

15 Claims, 5 Drawing Sheets

CONCEALED AUTOMOBILE GLARE SHIELD DEVICE WITH SLIDING GROOVE

BACKGROUND OF THE INVENTION

The present invention relates to a concealed automobile glare shield device with a sliding groove and, more particularly, to a concealed automobile glare shield device that can be concealed in an automobile sun visor with a central sliding groove to achieve smooth operation of pulling out of or storage in the sun visor, such that a driver encountering glare during driving can conveniently pull out the glare shield to block and filter the glare, thereby enhancing the driving safety.

Figure 6:
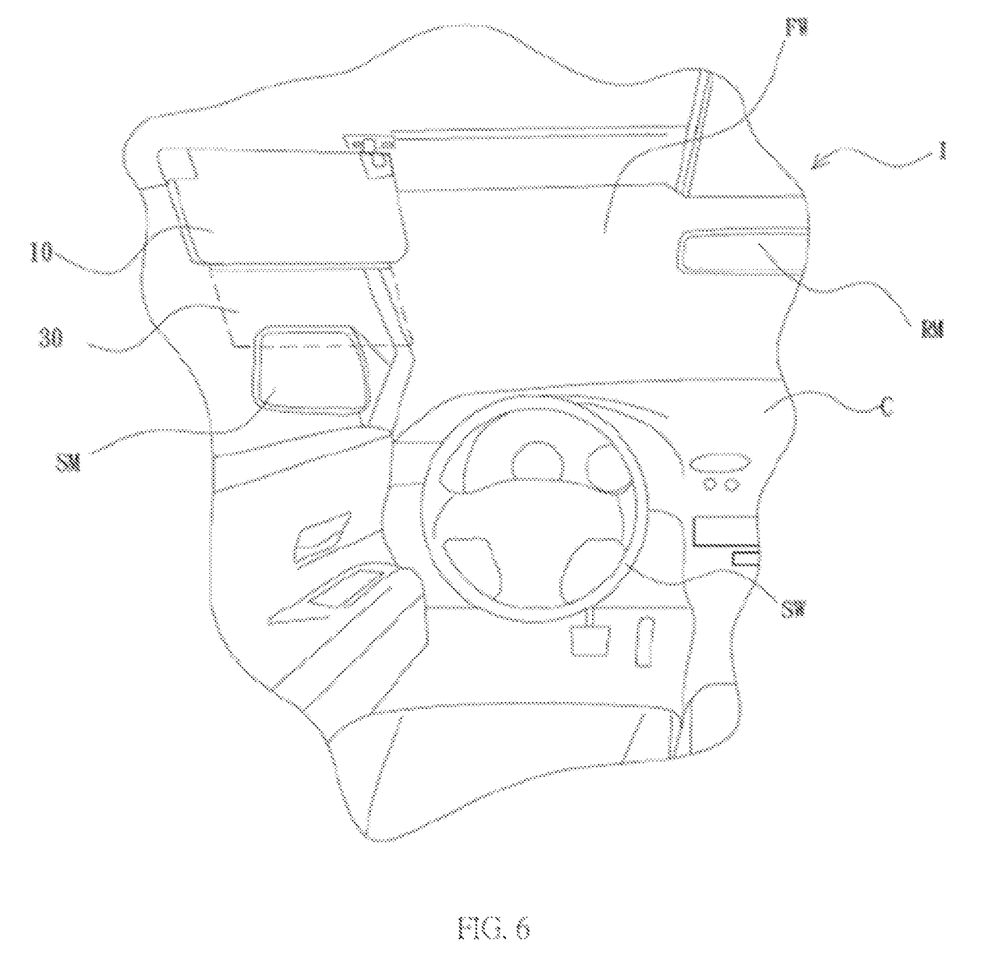
FIG. 6 is illustrating a portion of an interior space of a vehicle.

FIG. 6 shows a dashboard C in an interior space I of a vehicle. The driver sitting behind the steering wheel SW can see the traffic conditions in front of the vehicle through the windshield FW and can be aware of the traffic conditions behind the vehicle through the rearview mirror RM and the two side view mirrors SM. When encountering light incident through the windshield FW, the driver generally moves the sun visor 10 to a position blocking the light. However, the conventional sun visor 10 is not transmittable to light and, thus, should not be too large to adversely affect the driving safety. Aside from the danger caused by an excessively large sun visor 10 that blocks the eyesight in the limited interior space I of the vehicle, the driver has to move the sun visor 10 to a position trying to possibly block the glare according to the area of the sun visor 10 without blocking the whole eyesight. It is therefore a general problem to provide both the desired glare blocking effect and the driving safety.

In an approach to fulfill the need of improving driving safety while effectively filtering glare during driving using the conventional sun visor that is not transmittable to light and that must be restricted in a certain safety area, a light-transmittable glare shield is clipped to the sun visor. When encountering glare, the driver can pivot the glare shield at a side of the sun visor downward to shield the eyes from the light, increasing the driving safety. However, the glare shield clipped to the sun visor is visually protrusive and would block a make-up mirror and a night lamp, if any, disposed on the sun visor.

U.S. Pat. No. 5,662,371 discloses a sun visor light reducer extension having a three-sided rigid frame capable of being incorporated within a vehicle's sun visor. A glare shield is received in a groove defined by the rigid frame and has a pair of guide stops protruding slightly upward from its surface. An elastic urging member is disposed between two pivoted leg segments of the rigid frame. Each leg segment has a stopping tab extending inward. The stopping tabs act as a stopping means during discharge of the glare shield by forming a barrier when impinged against the guide stops. However, the resultant structure has a significant thickness and, thus, limits its practical utility. Furthermore, the guide stops can only prevent the glare shield from falling out of the sun visor, but the glare shield lacks mechanisms for abutting against the inner edge of the groove in the three-sided rigid frame, failing to provide lateral resistance. Thus, the glare shield cannot be precisely positioned and could even fall off. Furthermore, in the sliding support mechanism at the two lateral sides of the glare shield, the wider the glare shield, the longer the unbalanced force components at the two lateral sides when pulling the glare shield. The unbalanced force components cause shear force, such that a side is pressed while the other side slackens. After repeated pulling, the two lateral sides of the glare shield are worn to different extents and are, thus, apt to disengage. Thus, the glare shield cannot be positioned easily during displacement and, thus, cannot be used.

U.S. Pat. No. 4,828,314 discloses a visor with retractable glare shields. The visor includes a center board defining guide slots for receiving glare screens. A slot follower is disposed within one of the guide slots for guiding purposes. However, when pushing a glare screen by the central portion, the resistances at the two lateral sides cause an excessively large stress at the central portion, leading to difficulties in pushing. Thus, a user has to pull the glare screen with a larger force during operation, leading to larger wear extent between the follower and the guide slot. Specifically, due to the direct frictional contact between the lateral sides of the follower and the inner walls of the guide slot, gaps due to wear are generated after repeated use. The gaps make the pushing operation more unstable, aggregating the physical-contact wear.

Since the conventional techniques cannot effectively solve the two issues of stable sliding and wear of the concealed glare shield received in the sun visor, there are not many sun visors with concealed glare shields on the market. This is because conventional designs cannot solve the two issues at the same time.

BRIEF SUMMARY OF THE INVENTION

In a first aspect according to the present invention, a sun visor device comprises:

a sun visor including a receiving portion having two lateral sides, wherein each of the two lateral sides includes a guiding groove;

a glare shield received in the receiving portion; and a track device disposed in the receiving portion and including an outer track, a middle track, and an inner track supporting portion, wherein the middle track is received in and slidably abuts the outer track, wherein the inner track supporting portion includes an inner track, two positioning members, and a supporting rod, wherein the inner track is fixed to the supporting rod, wherein the two positioning members are disposed on two ends of the supporting rod, respectively, wherein each of the two positioning members includes a pressing spring received in a central portion thereof and a pressing member received in an outer end thereof, wherein the pressing spring biases the pressing member outwards to provide the pressing member with an outward pressing force, such that the pressing member slidably abuts an inner wall of an associated guiding groove of the sun visor, and wherein each of the two positioning members further includes a clamping unit fixed to two ends of the glare shield, such that the glare shield is jointly movable with the supporting rod to make the inner track slide relative to the sun visor.

In an example, the receiving portion includes an open side and a receiving groove in a central portion thereof. The receiving groove is recessed into a surface of the receiving portion to include a depth. The outer track of the track device is securely received in the receiving groove.

In an example, each guiding groove includes a protrusion and a positioning hole on an inner end thereof relative to the sun visor.

In an example, a lid is disposed to a connecting face on a top face of an outer edge of the receiving portion. A space defined by the receiving portion covered by the lid is slightly larger than a sum of a thickness of the glare shield and a thickness of the track device, avoiding wear to the glare shield when sliding in the receiving portion.

In an example, two sides of the middle track are two sliding sides with a plurality of balls. The two sliding sides slidably abut two track sides of the outer track. A length of the middle track is smaller than a length of the outer track. The middle track does not extend beyond the length of the outer track during sliding.

In an example, the inner track is an inverted track including two abutting sides which are disposed between and slidable along the sliding sides of the middle track. A length of the inner track is smaller than a length of the middle track. The inner track, the middle track, and the outer track are received in the depth of the receiving groove after assembly.

In an example, each of the two positioning members includes a pressing and holding member in a form of a hollow tube. An adjusting screw is in threading connection with an inner end of the pressing and holding member. The pressing spring received in a central portion of the pressing and holding member. The adjusting screw is rotatable to slightly adjust elasticity of the pressing spring, providing the pressing member with different outward pressing forces.

In a second aspect according to the present invention, a sun visor device comprises:

a sun visor including a receiving portion having an open side, wherein the receiving portion further includes a receiving groove in a central portion thereof, wherein the receiving portion further includes having two lateral sides, and wherein each of the two lateral sides includes a guiding groove;

a glare shield received in the receiving portion; and a track device disposed in the receiving groove and including an outer track, a middle track, and an inner track supporting portion, wherein the outer track is fixed in the receiving groove, wherein the middle track is received in and slidably abuts the outer track, wherein two sides of the middle track are two sliding sides with a plurality of balls, wherein the two sliding sides slidably abut two track sides of the outer track, wherein a length of the middle track is smaller than a length of the outer track, and wherein the middle track does not extend beyond the length of the outer track during sliding, wherein the inner track supporting portion includes an inner track, two positioning members, and a supporting rod, wherein the inner track is an inverted track including two abutting sides which are disposed between and slidable along the sliding sides of the middle track, wherein a length of the inner track is smaller than the length of the middle track, and wherein the inner track, the middle track, and the outer track are received in the depth of the receiving groove after assembly, wherein a top end of the inner track is fixed to the supporting rod, wherein the supporting rod is received in the receiving portion of the sun visor, wherein the two positioning members are disposed on two ends of the supporting rod, respectively, wherein each of the two positioning members slidably abuts an inner wall of an associated guiding groove of the sun visor, and wherein the two positioning members are fixed to two ends of the glare shield, such that the glare shield is jointly movable with the supporting rod to make the inner track slide relative to the sun visor.

In an example, when the glare shield is pulled outward, the two sliding sides of the middle track are actuated via the inner track to slide along the outer track. The moving speed of the inner track is faster than the moving speed of the two sliding sides of the middle track on the two track sides of the outer track, providing the glare shield with a larger extension travel.

In an example, the receiving groove is recessed into a surface of the receiving portion to include a depth.

In an example, each guiding groove includes a protrusion and a positioning hole on an inner end thereof relative to the sun visor.

In an example, a lid is disposed to a connecting face on a top face of an outer edge of the receiving portion. A space defined by the receiving portion covered by the lid is slightly larger than the sum of a thickness of the glare shield and a thickness of the track device, avoiding wear to the glare shield when sliding in the receiving portion.

In an example, a side of a top end of the inner track at the open end of the receiving portion is fixed perpendicularly to the supporting rod. The supporting rod is fixed to the top end of the inner track at a location. The location and another end of the inner track have a depth therebetween.

In an example, each of the two positioning member includes a pressing and holding member, an adjusting screw in threading connection with an inner end of the pressing and holding member, a pressing spring received in a central portion of the pressing and holding member, and a pressing member received in an outer end of the pressing and holding member. The adjusting screw is rotatable to slightly adjust elasticity of the pressing spring, providing the pressing member with different outward pressing forces.

In an example, each of the two positioning members further includes a clamping unit having a clamping portion fixed to an associated one of the two ends of the glare shield.

The present invention will become clearer in light of the following detailed description of illustrative embodiments of this invention described in connection with the drawings.

DETAILED DESCRIPTION OF THE INVENTION

Figures 1, 1A, 1B:
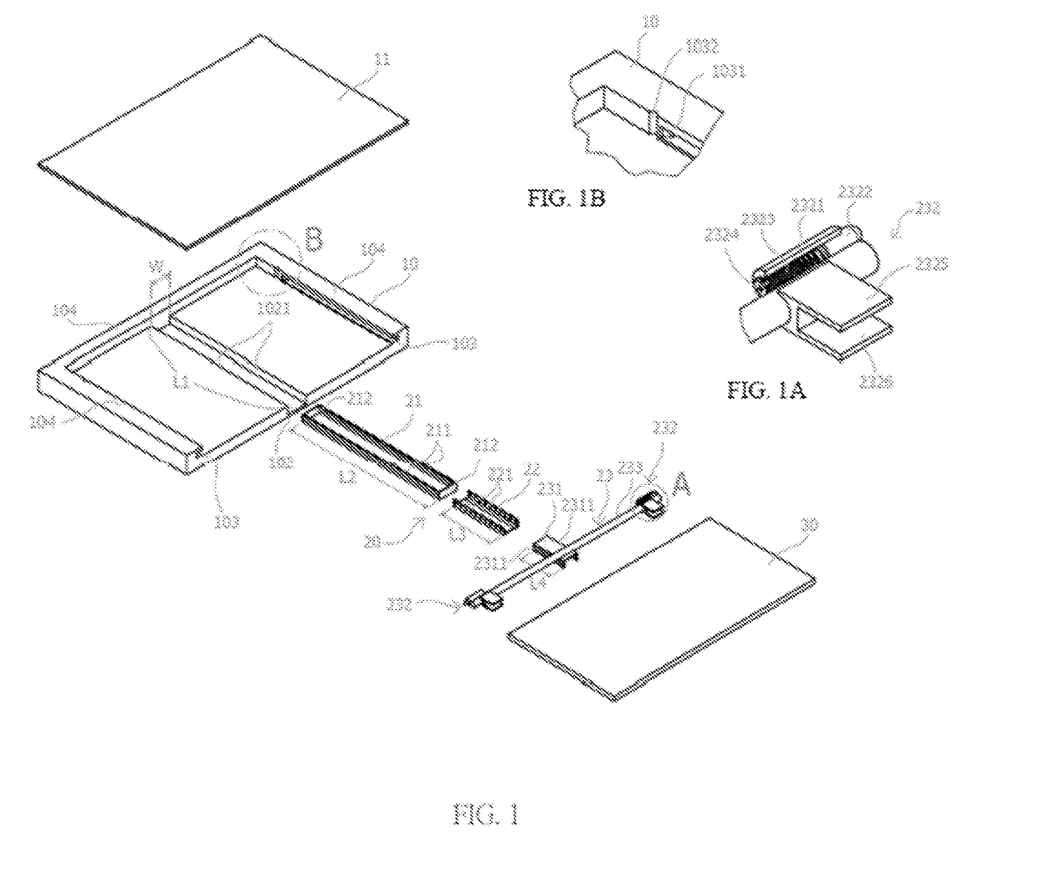
FIG. 1 is an exploded, perspective view of a sun visor device using a concealed automobile glare shield device of a preferred embodiment according to the present invention.
FIG. 1A is an enlarged view of a circled portion of FIG. 1, showing a portion of a positioning member.
FIG. 1B is an enlarged view of another circled portion of FIG. 1, showing a portion of a positioning portion of a guiding groove.

FIG. 1 shows an exploded, perspective view of a sun visor device using a concealed automobile glare shield device of a preferred embodiment according to the present invention.

To effectively solve the issue of the concealed glare shield in a sun visor 10 regarding inconvenient operation caused by the wear and resistance resulting from sliding movement at the two lateral sides or at the central portion, the sun visor device according to the present invention is featured by that a sliding device 20 is disposed in a receiving groove 102 in a central portion of the sun visor 10, providing a positional width W to balance the sliding movements at two lateral sides during operation. Furthermore, the sliding device 20 includes ball-supported three tracks to double the displacement, such that the whole sliding movement is smooth, thereby significantly reducing the resistance and wear.

FIG. 1A is an enlarged view of a circled portion of FIG. 1, showing a portion of a positioning member. FIG. 1B is an enlarged view of another circled portion of FIG. 1, showing a portion of a positioning portion of a guiding groove. The sun visor device using the concealed automobile glare shield device of the preferred embodiment according to the present invention comprises a sun visor 10 serving as a body. The sun visor 10 includes a receiving portion 101 having an interior space in which a glare shield 30 is telescopically received. The receiving portion 101 has an open side at an end thereof, permitting the glare shield 30 to move into or out of the receiving portion 101. In this preferred embodiment, the receiving portion 101 includes a receiving groove 102 in a central portion thereof. The receiving groove 102 has a length L1. The receiving groove 102 is recessed into a surface of the receiving portion 101 to include a larger depth. The receiving groove 102 includes two groove walls 1021 having a positioning width W (see FIG. 5) therebetween throughout the depth thereof. The interior space of the receiving portion 101 includes two lateral sides that are wider. Each of the two lateral sides of the receiving portion 101 has a guiding groove 103. The guiding grooves 103 are symmetric to each other. Each guiding groove 103 includes an inner end opposite to the open side of the sun visor 10. The inner end of each guiding groove 103 includes a protrusion 1031 and a positioning hole 1032. The sun visor 10 includes a connecting face 104 at a top face of an outer edge of the receiving portion 101.

The preferred embodiment according to the present invention is featured by that a track device 20 is disposed in the receiving groove 102. The track device 20 includes an outer track 21, a middle track 22, and an inner track supporting portion 23. The outer track 21 is a sliding track formed by pressing metal. The outer track 21 includes two track sides 211 opposite to each other. The outer track 21 is inserted into and fixed in the two groove walls 1021 and has a length L2 slightly smaller than the length L1 of the receiving groove 102. Each of two ends of the length L2 of the outer track 21 has an abutting end 212. The middle track 22 is disposed between the two track sides 211 of the outer track 21 and is substantially U-shaped. Each of two sides of the middle track 22 is a sliding side 221 with a plurality of balls. Each sliding side 221 abuts an associated one of the two track sides 211 of the outer track 21. The middle track 22 has a length L3 smaller than a half of the length L2 of the outer track 21. When sliding, the middle track 22 will not slide beyond the length L2 of the outer track 21.

The inner track supporting portion 23 includes an inner track 231, two positioning members 232, and a supporting rod 233. The inner track 231 is inverted U-shaped and has two abutting sides 2311. The two abutting sides 2311 slides along the sliding sides 221 with balls of the middle track 22. The inner track 231 has a length L4 smaller than the length L3 of the middle track 22. Furthermore, after assembly, the inner track 231, the middle track 22, and the outer track 21 are located in the depth of the receiving groove 102 of the receiving portion 101. A side of a top end of the inner track 231 at the open side of the receiving portion 101 is fixed perpendicularly to the supporting rod 233. The supporting rod 233 is fixed to the top end of the inner track 231 at a location. The location and another end of the inner track 231 have a depth D therebetween. The supporting rod 233 is located in the receiving portion 101 of the sun visor 10. The two positioning member 232 are disposed on two ends of the supporting rod 233, respectively.

In this preferred embodiment, each of the two positioning members 232 includes a pressing and holding member 2321 in the form of a hollow tube. An adjusting screw 2324 is in threading connection with an inner end of the pressing and holding member 2321 facing a center of the supporting rod 233. A pressing spring 2323 is received in a central portion of the pressing and holding member 2321. A pressing member 2322 is disposed in an outer end of the pressing and holding member 2321. The adjusting screw 2324 can be rotated to slightly adjust the elasticity of the pressing spring 2323, providing the pressing member 2322 at the other end of the pressing spring 2323 with different outward pressing forces. The pressing member 2322 slidably presses against the guiding groove 103 of the sun visor 10. Each of the two positioning members 232 further includes a clamping unit 2325 having a clamping portion 2326 fixed to an associated one of the two ends of the glare shield 30. Thus, the supporting rod 233 and the glare shield 30 are jointly movable to make the inner track 231 slide relative to the sun visor 10.

Figure 2:
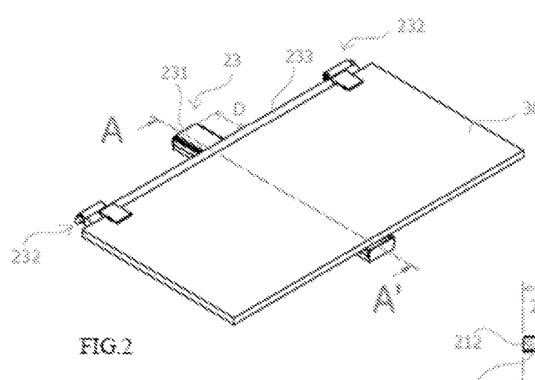
FIG. 2 is a perspective view of the concealed automobile glare shield device of the preferred embodiment in a storage position.
Figure 2A:
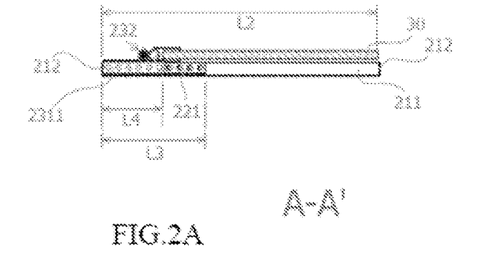
FIG. 2A is a cross sectional view taken along section line A-A' of FIG. 2.

FIG. 2 is a perspective view of the concealed automobile glare shield device of the preferred embodiment in a storage position. FIG. 2A is a cross sectional view taken along section line A-A' of FIG. 2. Due to the limitation in the thickness and the length of the sun visor 10 in an interior space of an automobile, one of the features of the present invention resides in that the glare shield 30 and the track device 20 are coupled together in an upper/lower relationship by the two positioning members 232. The receiving portion 101 and the receiving groove 12 are disposed in a vertical relationship in the sun visor 10 of a limited length to receive the glare shield 30 and the track device 20, such that a most compact structure in the upper/lower relationship and a maximal forward/rearward sliding space are provided. Thus, the glare shield 30 can move into or out of the receiving portion 101 of the sun visor 10 while obtaining the smoothest sliding/positioning effect and avoiding wear at the same time. When the glare shield 30 is received in the receiving portion 101 of the sun visor 10, the top end of the inner track 231 adjacent to the open side of the receiving portion 101 is fixed to the supporting rod 233 in a vertical direction, such that the glare shield 30 has a maximal exposed area ratio in the extended position and can be completely received in the receiving portion 101 of the sun visor 10. When the glare shield 30 is received in the sun visor 10, the outer track 21, the middle track 22, and the inner track 231 of the track device 20 are in a position in which the outer track 21 abuts the inner edge of the receiving groove 102 by a side of the abutting end 212.

When the glare shield 30 is pulled outward to the extended position, the abutting sides 2311 of the inner track 231 contact with and actuate the two sliding sides 221 with balls at two sides of the middle track 22 to slide. The two sliding slides 221 of the middle track 22 slide on the two track sides 211 of the outer track 21 by the balls. The moving speed of the inner track 231 is faster than the moving speed of the two sliding sides 221 of the middle track 22 on the two track sides 211 of the outer track 21. Thus, the glare shield 30 has a larger extension travel, and the ratio of the travel to length L2 of the outer track 21 can be smaller. The length L3 of the middle track 22 provides support for sliding contact for the abutting sides 2311 of the inner track 231. The length L4 of the inner track 231 withstands the stress imparted to the track device 20 resulting from the clamping of the sun visor 30 by the clamping units 2325 on the two ends of the supporting rod 233.

Figure 3:
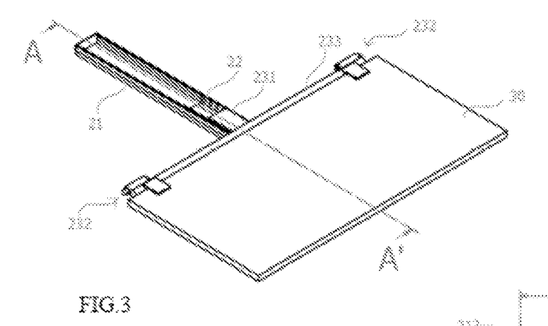
FIG. 3 is a perspective view of the concealed automobile glare shield device of the preferred embodiment in a storage position.
Figure 3A:
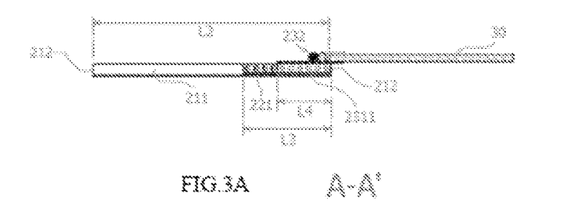
FIG. 3A is cross sectional view taken along section line A-A' of FIG. 3.

FIG. 3 is a perspective view of the concealed automobile glare shield device of the preferred embodiment in a storage position. FIG. 3A is cross sectional view taken along section line A-A' of FIG. 3. When the glare shield 30 is pulled outward to an end of its travel (i.e., the extended position), the inner track 231 and the middle track 22 move to a position adjacent to the abutting end 212 of the outer track 21 at the open end of the receiving groove 102. The length L4 of the inner track 231 reliably supports the glare shield 30 extended outside of the sun visor 10. The glare shield 30 is a board with a thickness. In a preferred embodiment, the glare shield 30 is not limited to a board permeable or impermeable to light. In a case of a light-permeable board, the board can be made of a material capable of filtering light. In another case of a light-impermeable board, the board is used to increase the light-blocking area.

Figure 4:
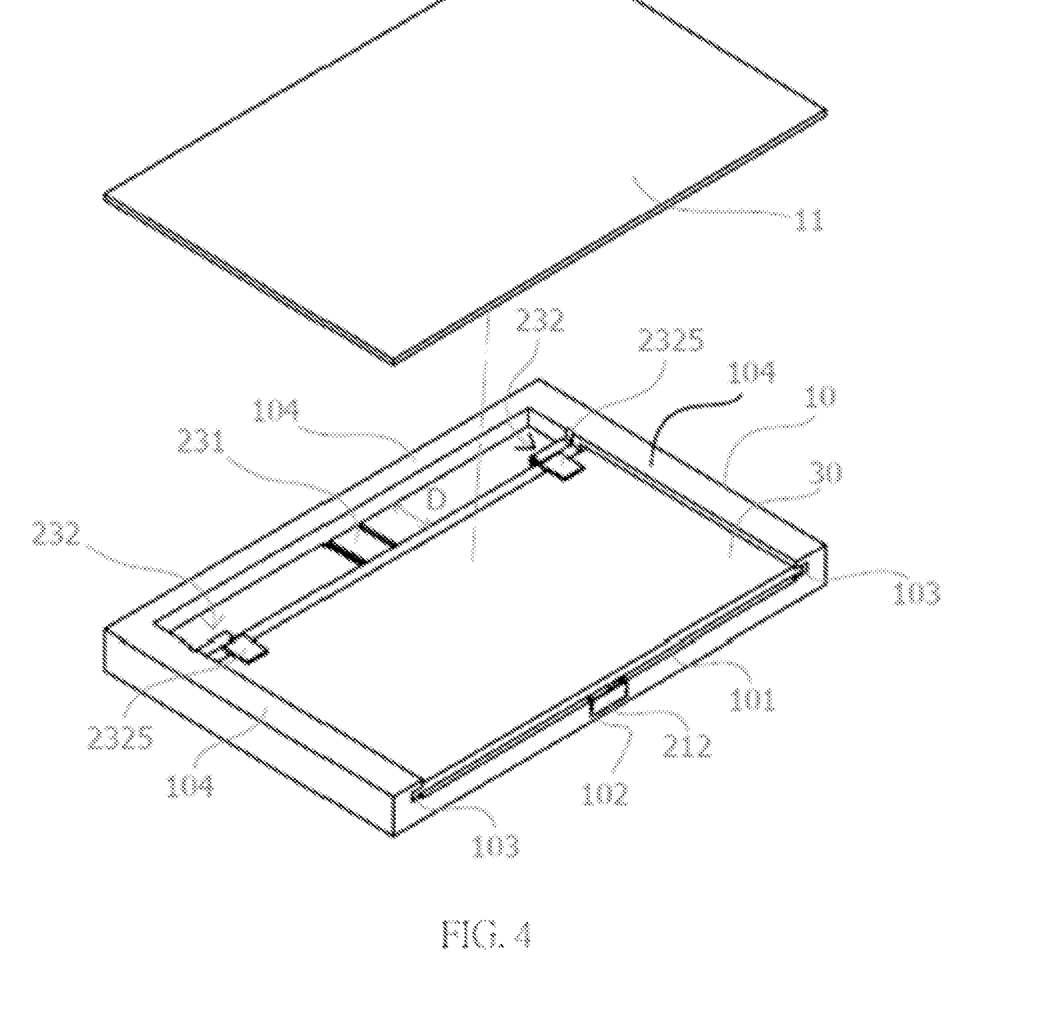
FIG. 4 is a partly-exploded perspective view of the sun visor device of the preferred embodiment in the storage position.
Figure 5:
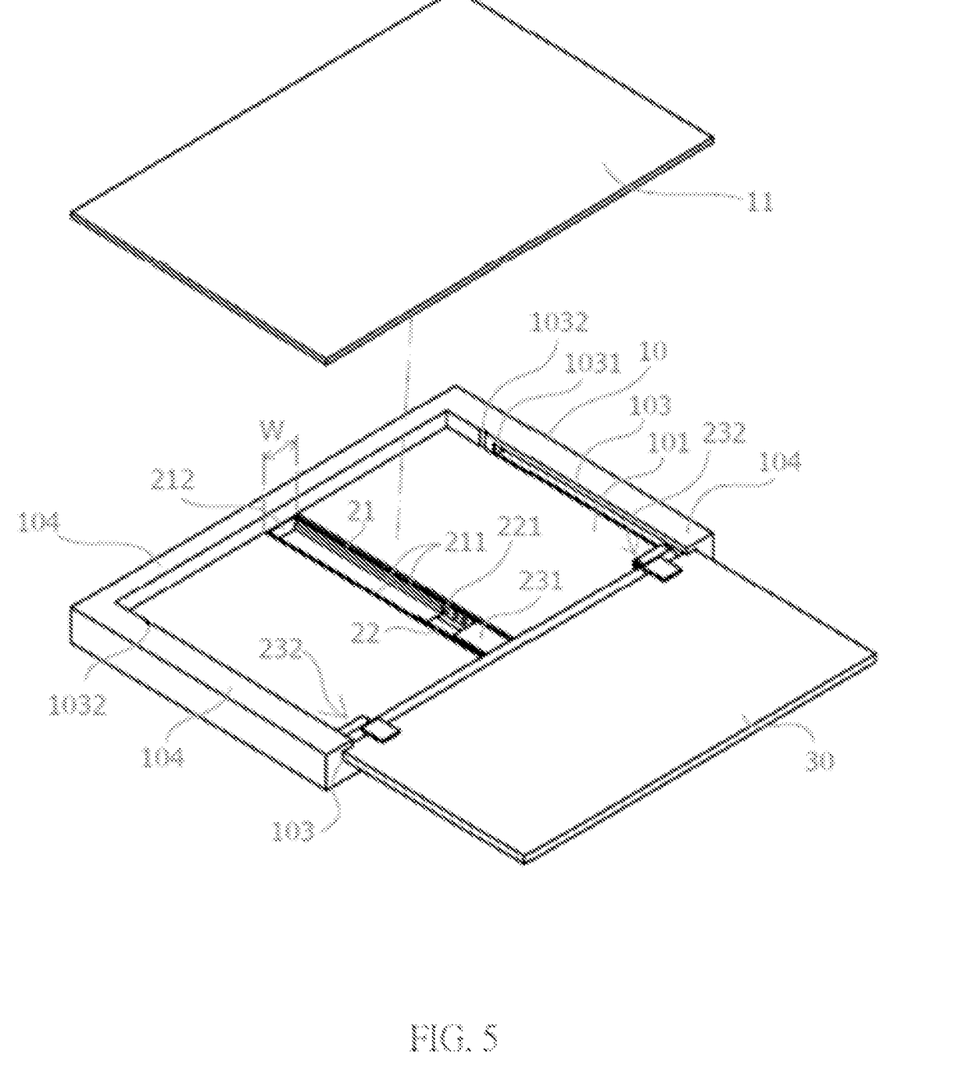
FIG. 5 is a partly-exploded perspective view of the sun visor device of the preferred embodiment in an extended position.

FIG. 4 is a partly-exploded perspective view of the sun visor device of the preferred embodiment in the storage position. FIG. 5 is a partly-exploded perspective view of the sun visor device of the preferred embodiment in an extended position. After the glare shield 30 and the track device 20 are mounted in the sun visor 10, the glare shield 30 can be completely received in the compartment 101 through the operation of the track device 20. Furthermore, the clamping units 2325 on the two sides of the supporting rod 233 permit the glare shield 30 to move between an extended position or the storage position in the receiving portion 101. It is noted that the glare shield 30 securely clamped by the clamping units 2325 on two sides of the supporting rod 233 have a maximum positioning width without clamping or pressing by the sun visor 10, thereby avoiding wear. Furthermore, the supporting rod 233 smoothly slides on the track device 20 to proceed with movement between the extended position and the storage position by the rolling contact (which causes minimal wear) of the inner track 231 through the balls, such that the operation is both smooth and reliable. The sun visor 10 can be securely held by the two clamping units 2325 by threading connection or bonding. The width of the sun visor 10 can be of a size permitting the two edges of the sun visor 10 to be selectively inserted or not inserted into the guiding grooves 103 for sliding purposes.

Furthermore, each of the guiding grooves 103 at two sides of the receiving portion 101 can selectively include a protrusion 1031 and a positioning hole 1032 at the inner end or the open end of the guiding groove 103. When the pressing member 2322 of each positioning member 232 is at either end of the travel in the associated guiding groove 103 of the sun visor 10, the protrusion 1031 provides a sense of resistance while pushing, such that the operator can feel the travel is near its end. The positioning hole 1032 of an associated protrusion 1031 at an end of the travel of the guiding groove 103 restricts further movement of the pressing member 2322 of the associated positioning member 232, providing a positioning effect. A lid 11 is disposed on the connecting face 104. The space formed after the lid 11 is disposed on the receiving portion 101 is slightly larger than the sum of the thickness of the glare shield 30 and the track device 20 to avoid wear to the glare shield 30 when sliding in the receiving portion 101.

It can be appreciated that each of the two ends of the supporting rod 233 can also include a pressing spring 2323 mounted around a central portion thereof and a pressing member 2322 mounted to an outer end portion thereof, with the pressing spring 2323 biasing the pressing member 2322 outward to slidably abut the wall of the associated guiding groove 103 of the sun visor 10. Furthermore, the guiding grooves 103 at two sides of the receiving portion 101 can selectively include a plurality of protrusions 1031 or positioning holes 1032 to provide a plurality of travel sections. The length of the glare shield 30 can be set to be received or partially protrude beyond the receiving portion 101. Based on the setting of the total width, the sun visor 10 can include a plurality of receiving grooves 102 in the receiving portion 101 to receive a corresponding number of track devices 20 for connecting with the same supporting rod 233 for the purposes of supporting a wider sun visor 10 and a wider glare shield 30, providing support for a larger area.

In view of the foregoing, the sun visor device using the concealed automobile glare shield device according to the present invention provides the driver with an aesthetic sun visor 10 with an extended shielding effect while achieving the best glare shield receiving efficiency and smooth operation as well as significantly reducing wear.

Although specific embodiments have been illustrated and described, numerous modifications and variations are still possible without departing from the scope of the invention. The scope of the invention is limited by the accompanying claims.

The invention claimed is:
1. A sun visor device comprising:
a sun visor including a receiving portion having two lateral sides, wherein each of the two lateral sides includes a guiding groove;
a glare shield received in the receiving portion; and
a track device disposed in the receiving portion and including an outer track, a middle track, and an inner track supporting portion, wherein the middle track is received in and slidably abuts the outer track, wherein the inner track supporting portion includes an inner track, two positioning members, and a supporting rod, wherein the inner track is fixed to the supporting rod, wherein the two positioning members are disposed on two ends of the supporting rod, respectively, wherein each of the two positioning members includes a pressing spring received in a central portion thereof and a pressing member received in an outer end thereof, wherein the pressing spring biases the pressing member outwards to provide the pressing member with an outward pressing force, such that the pressing member slidably abuts an inner wall of an associated guiding groove of the sun visor, and wherein each of the two positioning members further includes a clamping unit fixed to two ends of the glare shield, such that the glare shield is jointly movable with the supporting rod to make the inner track slide relative to the sun visor.

2. The sun visor device as claimed in claim 1, wherein the receiving portion includes an open side and a receiving groove in a central portion thereof, wherein the receiving groove is recessed into a surface of the receiving portion to include a depth, and wherein the outer track of the track device is securely received in the receiving groove.

3. The sun visor device as claimed in claim 1, wherein each guiding groove includes a protrusion and a positioning hole on an inner end thereof relative to the sun visor.

4. The sun visor device as claimed in claim 1, wherein a lid is disposed to a connecting face on a top face of an outer edge of the receiving portion, and wherein a space defined by the receiving portion covered by the lid is slightly larger than a sum of a thickness of the glare shield and a thickness of the track device, avoiding wear to the glare shield when sliding in the receiving portion.

5. The sun visor device as claimed in claim 1, wherein two sides of the middle track are two sliding sides with a plurality of balls, wherein the two sliding sides slidably abut two track sides of the outer track, wherein a length of the middle track is smaller than a length of the outer track, and wherein the middle track does not extend beyond the length of the outer track during sliding.

6. The sun visor device as claimed in claim 1, wherein the inner track is an inverted track including two abutting sides which are disposed between and slidable along the sliding sides of the middle track, wherein a length of the inner track is smaller than a length of the middle track, and wherein the inner track, the middle track, and the outer track are received in the depth of the receiving groove after assembly.

7. The sun visor device as claimed in claim 1, wherein each of the two positioning members includes a pressing and holding member in a form of a hollow tube, wherein an adjusting screw is in threading connection with an inner end of the pressing and holding member, wherein the pressing spring received in a central portion of the pressing and holding member, and wherein the adjusting screw is rotatable to slightly adjust elasticity of the pressing spring, providing the pressing member with different outward pressing forces.

8. A sun visor device comprising:
a sun visor including a receiving portion having an open side, wherein the receiving portion further includes a receiving groove in a central portion thereof, wherein the receiving portion further includes having two lateral sides, and wherein each of the two lateral sides includes a guiding groove;
a glare shield received in the receiving portion; and
a track device disposed in the receiving groove and including an outer track, a middle track, and an inner track supporting portion, wherein the outer track is fixed in the receiving groove, wherein the middle track is received in and slidably abuts the outer track, wherein two sides of the middle track are two sliding sides with a plurality of balls, wherein the two sliding sides slidably abut two track sides of the outer track, wherein a length of the middle track is smaller than a length of the outer track, and wherein the middle track does not extend beyond the length of the outer track during sliding,
wherein the inner track supporting portion includes an inner track, two positioning members, and a supporting rod, wherein the inner track is an inverted track including two abutting sides which are disposed between and slidable along the sliding sides of the middle track, wherein a length of the inner track is smaller than the length of the middle track, and wherein the inner track, the middle track, and the outer track are received in the receiving groove after assembly,
wherein a top end of the inner track is fixed to the supporting rod, wherein the supporting rod is received in the receiving portion of the sun visor, wherein the two positioning members are disposed on two ends of the supporting rod, respectively, wherein each of the two positioning members slidably abuts an inner wall of an associated guiding groove of the sun visor, and wherein the two positioning members are fixed to two ends of the glare shield, such that the glare shield is jointly movable with the supporting rod to make the inner track slide relative to the sun visor.

9. The sun visor device as claimed in claim 8, wherein when the glare shield is pulled outward, the two sliding sides of the middle track are actuated via the inner track to slide along the outer track, and wherein a moving speed of the inner track is faster than a moving speed of the two sliding sides of the middle track on the two track sides of the outer track, providing the glare shield with a larger extension travel.

10. The sun visor device as claimed in claim 8, wherein the receiving groove is recessed into a surface of the receiving portion to include a depth.

11. The sun visor device as claimed in claim 8, each guiding groove includes a protrusion and a positioning hole on an inner end thereof relative to the sun visor.

12. The sun visor device as claimed in claim 8, wherein a lid is disposed to a connecting face on a top face of an outer edge of the receiving portion, and wherein a space defined by the receiving portion covered by the lid is slightly larger than a sum of a thickness of the glare shield and a thickness of the track device, avoiding wear to the glare shield when sliding in the receiving portion.

13. The sun visor device as claimed in claim 8, wherein a side of a top end of the inner track at the open end of the receiving portion is fixed perpendicularly to the supporting rod, wherein the supporting rod is fixed to the top end of the inner track at a location, and wherein the location and another end of the inner track have a depth therebetween.

14. The sun visor device as claimed in claim 8, wherein each of the two positioning member includes a pressing and holding member, an adjusting screw in threading connection with an inner end of the pressing and holding member, a pressing spring received in a central portion of the pressing and holding member, and a pressing member received in an outer end of the pressing and holding member, and wherein the adjusting screw is rotatable to slightly adjust elasticity of the pressing spring, providing the pressing member with different outward pressing forces.

15. The sun visor device as claimed in claim 8, wherein each of the two positioning members further includes a clamping unit having a clamping portion fixed to an associated one of the two ends of the glare shield.

* * * * *